Figure 1:
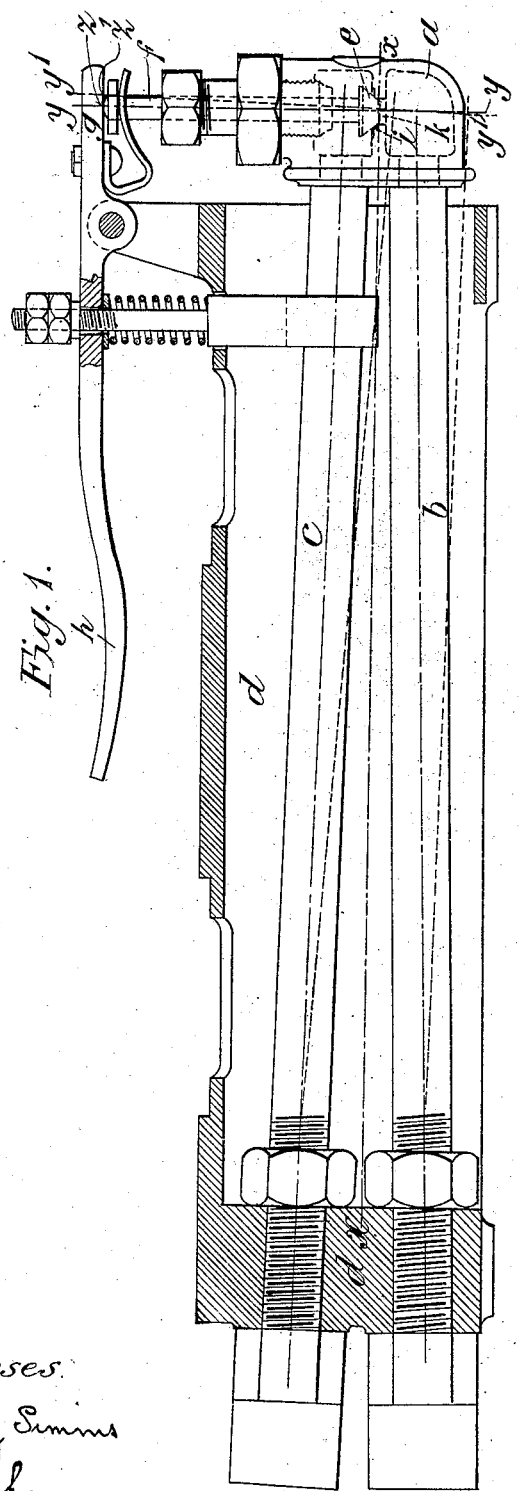

No. 845,630. PATENTED FEB. 26, 1907.
W. GEIPEL.
STEAM TRAP.
APPLICATION FILED JULY 12, 1906.

2 SHEETS—SHEET 1.

Witnesses
W Henry Simms
E. Clough

Inventor
W. Geipel
Attorney

No. 845,630. PATENTED FEB. 26, 1907.
W. GEIPEL.
STEAM TRAP.
APPLICATION FILED JULY 12, 1906.

2 SHEETS—SHEET 2.

Witnesses
W Henry Simms
E. Clough

Inventor
W. Geipel
Attorney

UNITED STATES PATENT OFFICE.

WILLIAM GEIPEL, OF SOUTHWARK, LONDON, ENGLAND.

STEAM-TRAP.

No. 845,630.  Specification of Letters Patent.  Patented Feb. 26, 1907.

Application filed July 12, 1906. Serial No. 325,860.

*To all whom it may concern:*

Be it known that I, WILLIAM GEIPEL, a subject of the King of Great Britain and Ireland, residing at Southwark, in the county of London, England, have invented Improvements in Steam-Traps, of which the following is a specification.

With expansion steam-traps of the kind described in the specifications of former Letters Patent of the United States—viz., Nos. 560,491 of 1896 and 594,005 of 1897—granted, respectively, to me and to W. T. Goold it is found in practice that although such traps act very effectually for the purpose for which they are designed yet the water-discharge valve does not always close in a perfectly steam-tight manner when the trap closes and the wear of the water-discharge valve and its seat is not always uniform. In such traps it has heretofore been the practice to fix the valve-case with water-discharge valve to the outer free ends of the two metal expansion-tubes in such a way that the common axis of the valve and its spindle is at right angles, or approximately so, to the length of the frame or stationary portion of the trap and to the center line between the two expansion-tubes, the outer end of the valve-spindle abutting against one arm of a spring-controlled hand-lever in a direction at right angles thereto. I have found as the result of close investigation of the working of such traps that there is frequently an imperfect closing of the valve, which is due to the fact that the outer end of the valve-spindle moves laterally to a small extent on the hand-lever when the trap opens or closes and that the pressure and friction between the spindle and lever prevent the spindle and valve properly returning to their original central positions relatively to the valve-seat when the trap closes, with the result that instead of being subjected to axial pressure only the spindle is also subjected to a more or less lateral pressure that tends to tilt the valve and prevent it bearing evenly upon its seat with uniform pressure all round the same.

Now an object of the present invention is to overcome the disadvantages above referred to. For this purpose I have found that by suitably inclining the water-discharge valve and its spindle to the expansion-tubes, and therefore to the length of the trap, and similarly inclining the arm of the spring-controlled hand-lever against which the valve-spindle bears, so that it is at right angles to the valve-spindle when the valve is closed, the outer end of the valve-spindle can be caused to bear against the lever at a point such that practically there will be no motion between the lever and spindle at that point when the trap opens and closes, or that should there be any motion between the two abutting parts it will be so small that it will have no detrimental effect, and therefore be negligible, the result being that the pressure between the lever and spindle will be exerted practically in the direction of the axis of the spindle, and so enable the valve to properly close at the required times.

Figure 2:
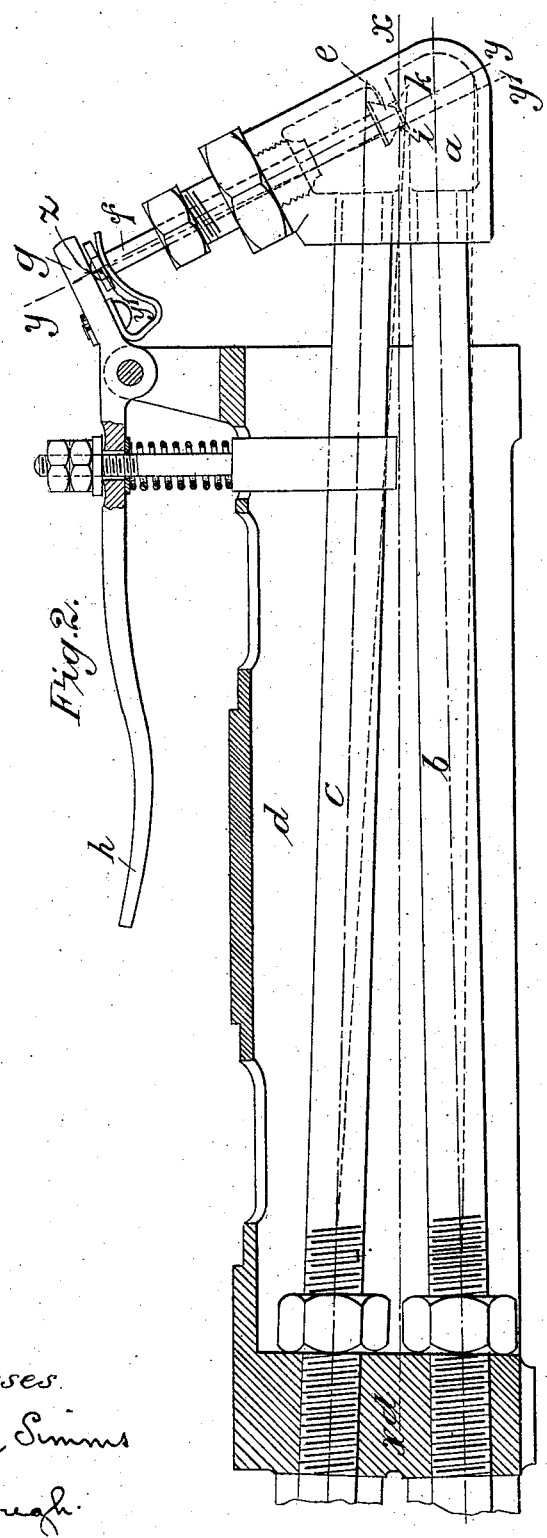

In the accompanying drawings, Figure 1 shows, partly in side elevation and partly in vertical section and more or less diagrammatically, the known construction of steam-trap hereinbefore referred to. Fig. 2 is a similar view showing the improved construction of steam-trap, the dot-and-dash center lines in each case showing the position of the parts when the trap is closed and the dotted center lines the positions of the parts when the trap is open, the extent of opening movement of the trap being in each case exaggerated in order to render the action more distinct.

Referring to Fig. 1, $a$ is the valve-case, fixed to the free ends of the inlet and outlet expansion-tubes $b$ and $c$, the other ends of which are rigidly fixed to the frame $d$ of the trap, the valve-case $a$ being arranged vertically with the axis of the water-discharge valve $e$ and its spindle $f$ also vertical and at right angles, or practically so, to the center line $x$ $x$ between the two tubes $b$ $c$ to the length of the trap-frame $d$ and to the face of the arm $g$ of the spring-controlled hand-lever $g$ $h$. With this arrangement when the tube $b$ contracts, owing to its becoming filled with water, and the various parts moved into the relative positions shown approximately in dotted lines corresponding to the open position of the trap, the common axis $y$ $y$ of the valve $e$ and valve-spindle $f$ is moved into the position indicated approximately by the line $y'$ $y'$, the outer end of the spindle being thus moved along the face of the lever-arm $g$—say from the point $z$ to the point $z'$. When the tube $b$ expands, owing to the water in it having been discharged and replaced by steam, the parts return to the position shown approximately in full lines; but in doing so the valve-spindle $f$ must move from $z'$ to $z$ against the pressure and friction existing at this part when the valve is closing or closed, with the result that the spindle $f$ and valve $e$ do not always return properly to the normal or vertical position when the trap closes and the valve is not properly pressed against its seat $i$ and does not close in a perfectly fluid-tight manner.

By suitably inclining the valve $e$ and valve-spindle $f$ to the center line $x$ $x$ between the expansion-tubes $b$ $c$ and to the length of the trap-frame $d$, as indicated in Fig. 2, and suitably inclining the arm $g$ of the spring-controlled hand-lever $g$ $h$, so that the inclined valve-spindle will normally abut against the face of such arm in a direction at right angles thereto, the outer end of the valve-spindle can be caused to bear on the lever-arm $g$ at a point $z$, such that there will be no motion or practically no motion between the two when the trap opens and closes. Consequently when the trap closes there will be no tilting action on the valve $e$, which will therefore be caused to bear evenly all around its seat $i$ in the valve-case $a$ and close the water-discharge opening $k$ in an effective manner. The necessary inclination of the valve and valve-spindle to enable the above result to be attained can be determined by trial. For a steam-trap of the dimensions shown in the drawings a suitable inclination for the common axis of the spindle $f$ and valve $e$ relatively to the center line of the tube $b$ is about 64°, (sixty-four degrees.)

What I claim is—

1. An expansion steam-trap comprising a stationary frame, inlet and outlet expansion-tubes fixed at one end thereto, a valve-case fixed to the free ends of said tubes and formed with a water-discharge passage for placing said tubes in communication with each other and with a valve-seat around said passage, a water-discharge valve controlling said passage and provided with a spindle extending through said valve-case to the exterior thereof, and an abutment acting against the outer end of said valve-spindle, the said valve-seat, valve and valve-spindle having a common axis that is inclined to the center line between said tubes and to the longitudinal direction of said frame and is normal to said abutment.

2. An expansion steam-trap comprising a stationary frame, inlet and outlet expansion-tubes fixed at one end thereto, a valve-case fixed to the free ends of said tubes and formed with a water-discharge passage for placing said tubes in communication with each other and with a valve-seat around said passage, a water-discharge valve controlling said passage and provided with a spindle extending through said valve-case to the exterior thereof, and a spring-controlled lever pivoted to said frame and having one arm thereof acting against the outer end of said valve-spindle, the said valve-seat, valve and valve-spindle having a common axis that is inclined to the center line between said tubes and to the longitudinal direction of said frame, and the acting surface of said lever-arm being inclined to said center line and at right angles to said common axis.

3. An expansion steam-trap comprising a stationary frame, inlet and outlet expansion-tubes fixed at one end thereto, a valve-case fixed to the free ends of said tubes and formed with a water-discharge passage for placing said tubes in communication with each other and with a valve-seat around said passage, a water-discharge valve controlling said passage and provided with a spindle extending through said valve-case to the exterior thereof, and a spring-controlled lever pivoted to said frame and having an arm thereof acting against the outer end of said valve-spindle, the said valve-seat, valve and valve-spindle having a common axis that is inclined to the center line between said tubes and to the longitudinal direction of said frame and said valve-spindle bearing at its outer extremity at right angles to and against said arm at a point thereon that remains practically invariable notwithstanding the movement of the valve and valve-spindle relatively to said valve-case consequent on the operation of the trap, substantially as described for the purpose specified.

Signed at London, England, this 29th day of June, 1906.

WILLIAM GEIPEL.

Witnesses:
H. D. JAMESON,
F. L. RAND.